July 5, 1927.  
J. A. SMITMANS  
SHEAR  
Filed Jan. 14, 1926  
1,634,275  
2 Sheets-Sheet 1

INVENTOR  
John A. Smitmans,

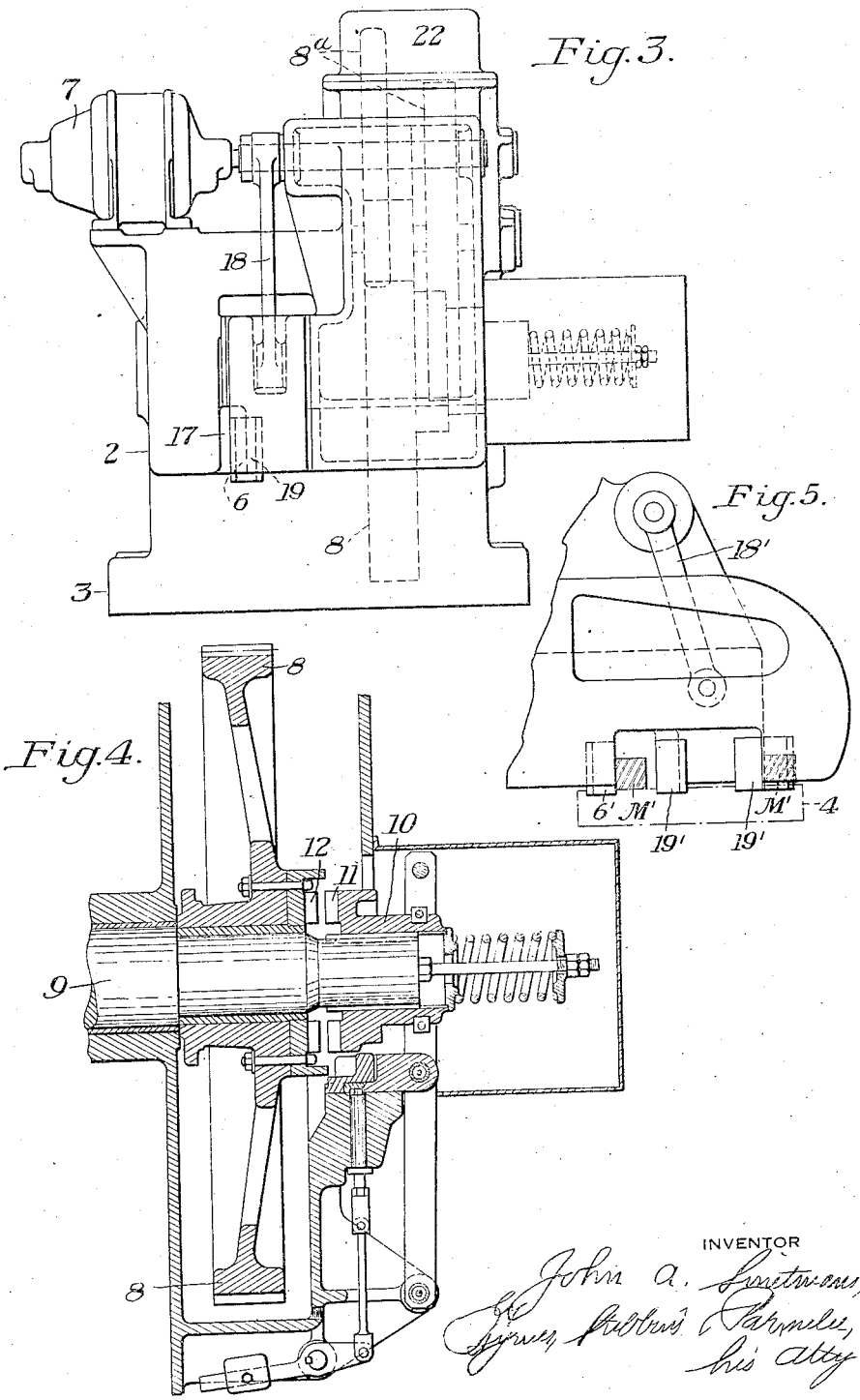

Patented July 5, 1927.

1,634,275

UNITED STATES PATENT OFFICE.

JOHN A. SMITMANS, OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA.

SHEAR.

Application filed January 14, 1926. Serial No. 81,201.

The present invention relates broadly to the art of metal working and more particularly to improved shears for the cutting of billets, bars and the like, although the utility of the invention is not limited with respect to the material being cut.

This invention has for one of its objects the provision of a shear frame adapted to be located and supported entirely at one side of a carrier, such as a roll table, the frame being constructed whereby a portion thereof projects over the carrier and is provided with shear blades for material delivered by the carrier.

Another object of the invention is to provide a construction such that an extremely simple shear is afforded requiring only a single tension or compression member which may be directly operated without any accurate top or bottom slides or other supports, and consequently of such nature that machining and assembly difficulties are reduced to a minimum.

In the accompanying drawings there are shown for purposes of illustration only certain preferred embodiments of the present invention, it being understood that the drawings do not define the limits of my invention, as changes in the construction and operation disclosed therein may be made without departing either from the spirit of the invention or the scope of my broader claims.

In the drawings:

Figure 3 is an end elevational view of the construction of Figure 1;

Figure 4 is a detail sectional view, on an enlarged scale, taken along the line IV—IV of Figure 1 and looking in the direction of the arrows; and Figure 5 is a side elevational view similar to Figure 2, but illustrating a portion only of a modified form of shear.

Figure 1:
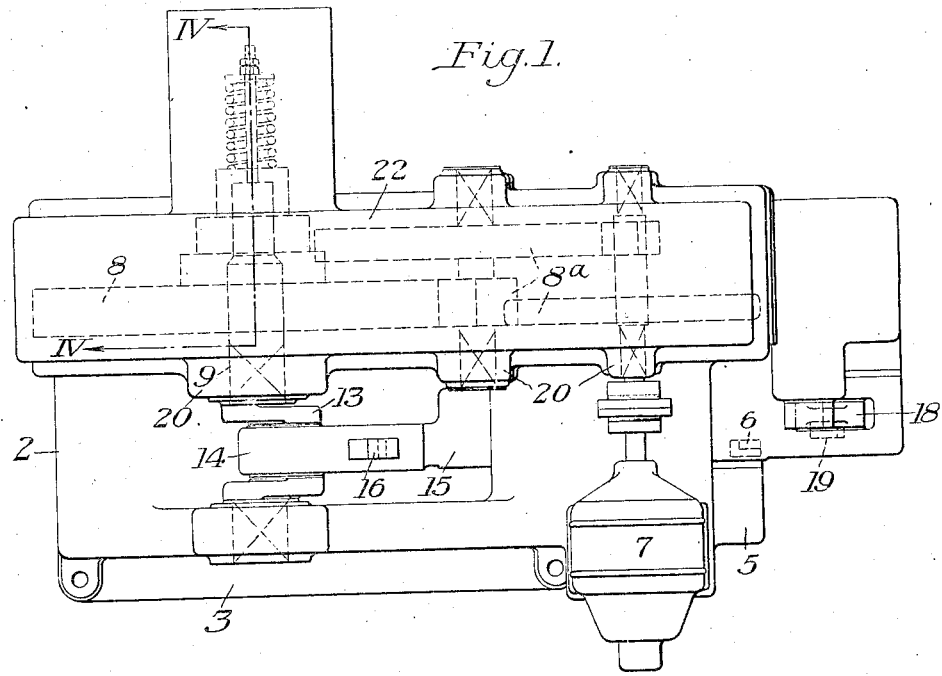
Figure 1 is a top plan view of a shear constructed in accordance with the present invention.

In accordance with the present invention there may be provided a shear frame 2 having a base 3 adapted to be supported entirely outside of the area occupied by a carrier herein illustrated diagrammatically as comprising a roll table 4. The frame has a projection 5 adapted to extend over the carrier, and provided with a relatively stationary shear blade 6 adapted to cooperate with a material M delivered by the carrier for shearing.

Mounted at a suitable point on the frame is an operating motor 7 adapted to drive a gear 8 through a suitable train of reducing gears 8ª. The gear 8 is mounted freely on one end of an eccentric shaft 9, which also carries a clutch member 10 slidable axially thereof and provided with a clutch face 11 adapted to cooperate with a similar face 12 on the gear 8. The clutch member 10 is keyed to the shaft 9 for rotation therewith, whereby upon movement of the clutch member such as required to bring the faces 11 and 12 into engagement, rotation will be imparted to the shaft 9. The particular form of clutch controlling mechanism illustrated herein constitutes no particular part of the present invention, and any other desired form of mechanism may be utilized as found desirable, or the shear may be used without a clutch.

Formed adjacent the opposite end of the eccentric shaft 9 is a crank or eccentric 13 which cooperates with a strap 14 connected in any desired manner to one end of a shear bar 15, the connection herein being illustrated as comprising a key 16 extending through the strap and the bar for locking the same together.

The shear bar is adapted to travel loosely, except as to side play, through a suitable opening 17 in the frame, such movement being accomplished by providing a link support 18 for the outer end of the shear bar, this link support tending to cause the shear bar to travel in the desired direction upon operation of the shaft 9. This construction has been found to be highly desirable inasmuch as it obviates the necessity of providing special top and bottom slides or supports for the shear bar, thereby facilitating the construction and assembly of the apparatus and also reducing friction to a minimum. The shear bar has its outer ends shaped to accommodate a shear blade 19 adapted to cooperate with the blade 6 carried by the frame.

Figure 2:
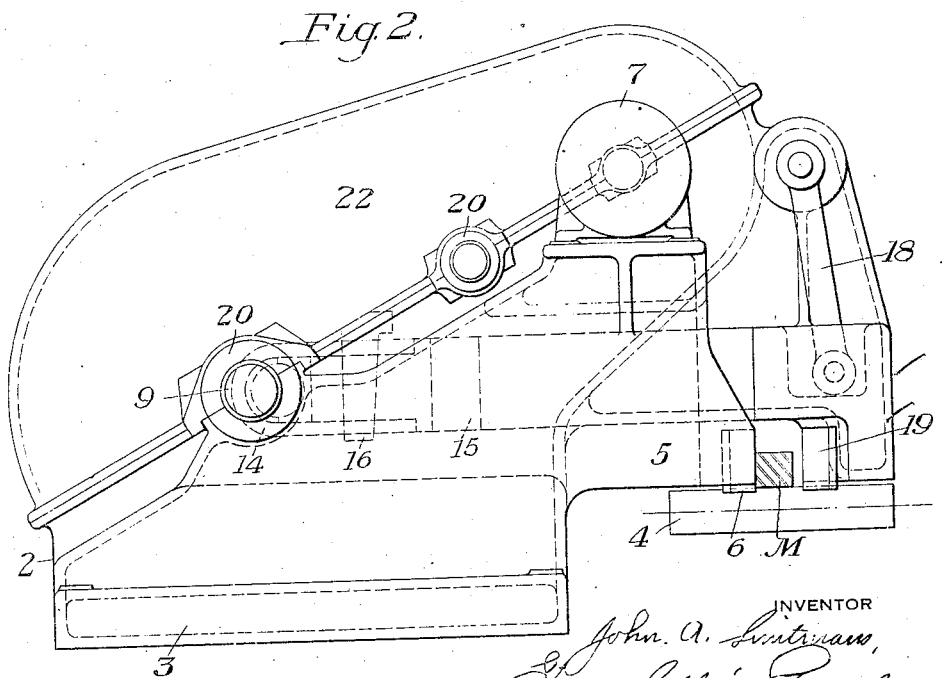
Figure 2 is a side elevational view of the shear illustrated in Figure 1.

From the foregoing it will be apparent to those skilled in the art that the shear bar may be of heavy construction adapted to withstand the strains to which it is subjected in use, the bar in the form of Figures 1 to 3 inclusive acting as a tension member during each shearing operation while the frame acts as a compression member.

The various bearings 20 for the shafts of the gear train and of the motor are preferably positioned in a common inclined plane whereby they are all accessible by the mere expedient of removing a cover 22. This inclined relationship of the various bearings and shafts also provides a compact assembly cooperating with the frame to effectively permit the supporting thereof at one side of a carrier and the projection of the shear blades over the carrier.

In Figure 5 of the drawings there is shown another embodiment of the invention in which there is provided a double acting or double cut shear. In this form parts corresponding to parts previously described are designated by the same reference characters having a prime affixed thereto. In the previously described figures the movable shear bar has been described as a tension member and the stationary shear frame a compression member. This is the preferable design as it represents the most economical one of the various materials entering into the construction of the machine. As apparent from Figure 5, however, the shear bar may be a compression member, as would be the case when shearing the right hand piece of material M', and the frame 5', the tension member, or the shear bar and frame may be alternately under compression and tension as necessitated by the double acting arrangement shown involving oppositely directed shear blades on both the bar and frame.

Certain advantages of the present invention arise from the provision of a frame adapted to be supported entirely at one side of a carrier so as to be movable at will independently of the carrier, and carrying the shear blades effective for shearing material delivered by the carrier.

Other advantages of the present invention arise from the provision of a shear of such construction that the shear bar need not be mounted upon accurate top and bottom guides within the supporting frame, and from a construction in which the shear bar may serve as the tension member and the frame as the compression member, or vice versa.

Still other advantages arise from the relative arrangement of the shafts carrying the gears of the gear train whereby a single cover may be provided for protecting all of the gears and affording access to the shafts, and also providing a compact assembly in which the frame may be easily formed with an opening in line with the crank for the free passage of the shear bar.

I claim:

1. In a shear, a frame, a crank carried by said frame, a shear bar operated by said crank, a lever support for the outer end of said shear bar, and shear blades carried by said bar and frame respectively, and having cutting edges disposed angularly with respect to the length of the shear bar, substantially as described.

2. In a shear, a frame, a crank carried by said frame, a shear bar operated by said crank, a lever support for the outer end of said shear bar, and oppositely directed shear blades carried by said bar and frame respectively, and having cutting edges disposed angularly with respect to the length of the shear bar, substantially as described.

3. In a shear, a frame, a crank carried thereby, a shear bar carried at one end and operated by said crank, said frame having an opening therethrough for the free passage of said shear bar, a link support for the outer end of said shear bar, and shear blades carried by said bar and frame respectively, substantially as described.

4. In a shear, a frame, a crank carried thereby, a shear bar supported at one end by said crank and operated thereby, said frame having an opening therethrough for the free passage of said shear bar, a link support for the other end of said shear bar, and oppositely directed shear blades carried by said bar and frame respectively, substantially as described.

5. In a shear, a frame, a crank carried thereby, a shear bar operated by said crank, said shear bar extending substantially horizontal, a rocking support for the outer end of said shear bar, and shear blades carried by said bar and frame respectively, and having cutting edges disposed angularly with respect to the length of the shear bar, substantially as described.

6. In a shear, a frame, a crank carried thereby, a shear bar operated by the crank in a generally horizontal direction, the shear bar having a cutting edge extending angularly with respect to the direction of its motion, a rocking support for the outer end of the shear bar, and a cutting edge on the frame for cooperation with the first mentioned cutting edge, substantially as described.

7. In a shear, a carrier, a frame comprising a base adapted to be located at one side of the carrier, a crank positioned over the base, a bar operatively connected to the crank and projecting therefrom, a rocking support for the outer end of the bar adapted to support the bar over the carrier, the crank being operative to move the bar across the carrier, and shear blades carried by the bar and frame respectively and operative upon movement for shearing material on the carrier, substantially as described.

8. In a shear, a frame having an opening extending horizontally therethrough, a shear bar movable through said opening and extending beyond said frame said shear bar having a cutting edge extending substantially at right angles to its direction of motion, a crank for operating said shear bar, and a support for the outer end of said shear bar, said bar having its upper and lower surfaces out of supporting contact with the frame intermediate said crank and said support, substantially as described.

9. In a shear, a frame having an opening extending horizontally therethrough, a shear bar loosely movable through said opening, a crank directly carrying one end of and operating said shear bar, and a support for the outer end of said shear bar, said bar having its upper and lower surfaces out of supporting contact with the frame intermediate said crank and said support, said support comprising a link pivotally connected to the frame and said bar, substantially as described.

10. In a shear, a shear bar adapted for movement in a generally longitudinal direction, and a movable support for each end of said bar, and a shear blade projecting angularly from said bar, substantially as described.

11. In a shear, a shear bar, and a movable support for each end of said bar, one of said supports comprising a link, and a shear blade projecting angularly from said bar, substantially as described.

12. In a shear, a shear bar adapted for movement in a generally longitudinal direction, and a movable support for each end of said bar, one of said supports constituting operating means for the bar, and a shear blade projecting angularly from said bar, substantially as described.

13. In a shear, an operating crank, a shear bar adapted for movement in a generally longitudinal direction and supported by said crank at one end, and a movable support for the other end of said bar, substantially as described.

14. In a shear, an operating crank, a shear bar supported by said crank at one end, and a movable support for the other end of said bar, said support comprising a pivotally mounted link, substantially as described.

15. In a shear, a frame, a crank mounted in said frame, a shear bar carried at one end by said crank and adapted to be operated thereby, a swinging support for the outer end of said bar, and shear blades on said bar and frame respectively, substantially as described.

16. In a shear, a frame, a crank journaled in said frame, a shear bar directly cooperating with said crank at one end and supported thereby, supporting means for the other end of said shear bar adapted to permit longitudinal movement thereof, and shear blades carried by said bar and frame respectively, substantially as described.

17. In a shear, a frame, a crank journalled in said frame, a shear bar directly cooperating with said crank at one end and supported thereby, supporting means for the other end of said shear bar adapted to permit substantially horizontal movement thereof, and substantially vertical shear blades carried by said bar and frame respectively, substantially as described.

18. In a shear, a supporting frame, an eccentric journalled therein, a shear bar directly engaging said eccentric and entirely supported at one end thereby for reciprocating movement upon actuation of said eccentric, and a link pivotally connected to said bar adjacent its opposite end, and a pivotal axis for the other end of said link mounted in said frame, said link having a pivotal movement only about said axis, substantially as described.

19. In a shear, a shear bar adapted for movement in a generally longitudinal direction, a swinging support for one end of the bar, a movable support for the other end of the bar, and a shear blade projecting angularly from the bar, substantially as described.

In testimony whereof I have hereunto set my hand.

JOHN A. SMITMANS.